US010082236B2

(12) United States Patent
Carella et al.

(10) Patent No.: US 10,082,236 B2
(45) Date of Patent: Sep. 25, 2018

(54) MULTILAYER ASSEMBLY

(71) Applicant: SOLVAY SPECIALTY POLYMERS ITALY S.P.A., Bollate (IT)

(72) Inventors: Serena Carella, Parabiago (IT); Amelia Mennella, Torre del Greco (IT); Marco Colladon, Breda di Piave (IT); Giambattista Besana, Mariano Comense (IT); Ségolène Brusseau, Tavaux (FR); Giulio Brinati, Milan (IT); Stephen J. Edmondson, Wiltshire (GB)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 0 days.

(21) Appl. No.: 15/576,623

(22) PCT Filed: Nov. 2, 2015

(86) PCT No.: PCT/EP2015/075416
§ 371 (c)(1),
(2) Date: Nov. 22, 2017

(87) PCT Pub. No.: WO2016/188592
PCT Pub. Date: Dec. 1, 2016

(65) Prior Publication Data
US 2018/0163914 A1   Jun. 14, 2018

(30) Foreign Application Priority Data
May 22, 2015   (EP) .................................... 15305776

(51) Int. Cl.
*F16L 58/10*   (2006.01)
*B05D 5/08*   (2006.01)
*B05D 7/00*   (2006.01)

(52) U.S. Cl.
CPC .......... *F16L 58/1027* (2013.01); *B05D 5/083* (2013.01); *B05D 7/56* (2013.01); *F16L 58/1072* (2013.01)

(58) Field of Classification Search
CPC .. F16L 58/1027; F16L 58/1072; B05D 5/083; B05D 7/56
See application file for complete search history.

(56) References Cited

U.S. PATENT DOCUMENTS

| | | |
|---|---|---|
| 4,048,355 A | 9/1977 | Sakayori et al. |
| 4,213,486 A | 7/1980 | Samour et al. |
| 4,314,004 A | 2/1982 | Stoneberg |
| 4,732,632 A | 3/1988 | Pieslak et al. |
| 4,824,728 A | 4/1989 | Parsons et al. |
| 4,849,301 A | 7/1989 | Kanasashi et al. |
| 4,853,297 A | 8/1989 | Takahashi et al. |
| 4,916,020 A | 4/1990 | Golding et al. |
| 5,932,306 A | 8/1999 | Usui |
| 6,235,361 B1 | 5/2001 | Jacquemet et al. |
| 6,686,058 B1 | 2/2004 | Yoshida |
| 2001/0029990 A1 | 10/2001 | Takahashi et al. |
| 2002/0090528 A1 | 7/2002 | Usui |
| 2003/0087100 A1 | 5/2003 | Amouroux et al. |

FOREIGN PATENT DOCUMENTS

| | | |
|---|---|---|
| DE | 2547032 A1 | 4/1977 |
| EP | 0460973 A2 | 12/1991 |
| GB | 2165772 A1 | 4/1986 |
| JP | 08300554 A2 | 11/1996 |
| WO | 9012657 A1 | 11/1990 |
| WO | 9203234 A1 | 3/1992 |
| WO | 06045630 A2 | 5/2006 |
| WO | 2008129041 A1 | 10/2008 |
| WO | 11050427 A1 | 5/2011 |

*Primary Examiner* — Michael C Miggins

(57) ABSTRACT

The present invention pertains to a multilayer assembly, to a process for the manufacture of said multilayer assembly, to a pipe comprising said multilayer assembly and to uses of said pipe in various applications.

18 Claims, No Drawings

MULTILAYER ASSEMBLY

This application is a U.S. national stage entry under 35 U.S.C. § 371 of International Application No. PCT/EP2015/075416 filed Nov. 2, 2015, which claims priority to European application No. EP 15305776.5 filed on May 22, 2015, The entire contents of these applications are explicitly incorporated herein by this reference.

TECHNICAL FIELD

The present invention pertains to a multilayer assembly, to a process for the manufacture of said multilayer assembly, to a pipe comprising said multilayer assembly and to uses of said pipe in various applications.

BACKGROUND ART

Off-shore pipelines, used to pump oil and gas ashore from off-shore drilling rigs and terminals, are required to be capable of withstanding very high internal pressures and temperatures and are therefore typically made of metals such as iron and steel.

However, among major issues encountered with metal pipelines in general, and on-shore and off-shore pipelines in particular, is the problem of corrosion due to the severe environment, which causes a deterioration of the material and, as a consequence, reduces its thermal and chemical resistance.

It is well known that coatings based on fluoropolymers, in particular vinylidene fluoride-based polymers, are advantageously resistant to these severe environment conditions on account of their chemical resistance to hydrocarbons and/or corrosive gases at temperatures typically between 100° C. and 160° C.

Also, it is well known that a primer is typically used in order to enhance adhesion of a fluoropolymer top coat to the metal pipeline.

However, despite the use of a primer, harsh conditions of high temperature and/or pressure, which coated metal pipelines are subjected to, in particular in the oil and gas industry, adversely affect the adhesion of the coating to the metal. Disbondment is typically caused by permeation of moisture or oxygen through the top coat. As a consequence, the primer becomes brittle and detachment of the coating from the metal can be observed, resulting in an increased corrosion of the same.

SUMMARY OF INVENTION

It has been now surprisingly found that the multilayer assembly of the invention advantageously withstand severe environment conditions and successfully exhibits outstanding interlayer adhesion properties, while maintaining good anti-corrosion properties and good thermal insulation properties.

In a first instance, the present invention pertains to a multilayer assembly comprising:
a layer [layer (L1)] consisting of a composition [composition (C1)] comprising at least one metal compound [compound (M)],
said layer (L1) having a first surface and a second surface,
a layer [layer (L2)] consisting of a composition [composition (C2)] comprising at least one epoxy resin [resin (E1)],
said layer (L2) having a first surface and a second surface, wherein the first surface of said layer (L2) is directly adhered to the second surface of said layer (L1), and
a layer [layer (L3)] consisting of a composition [composition (C3)] comprising at least one functional fluoropolymer [functional polymer (F1)] comprising recurring units derived from at least one (meth)acrylic monomer [monomer (MA)] of formula (I):

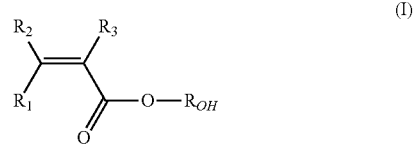

wherein each of $R_1$, $R_2$ and $R_3$, equal to or different from each other, is independently a hydrogen atom or a $C_1$-$C_3$ hydrocarbon group, and $R_{OH}$ is a $C_1$-$C_5$ hydrocarbon group comprising at least one hydroxyl group, said layer (L3) having a first surface and a second surface, wherein the first surface of said layer (L3) is directly adhered to the second surface of said layer (L2).

The composition (C2) may further comprise at least one fluoropolymer [polymer (F)].

The layer (L2) typically consists of a composition (C2) comprising:
from 10% to 100% by weight, preferably from 50% to 100% by weight, with respect to the total weight of said composition (C2), of at least one resin (E1), and
optionally, from 0.1% to 90% by weight, preferably from 0.1% to 50% by weight, with respect to the total weight of said composition (C2), of at least one polymer (F).

The polymer (F) of the composition (C2), if any, is typically selected from the group consisting of functional fluoropolymers [functional polymers (F)] and non-functional fluoropolymers [non-functional polymers (F)].

The layer (L3) advantageously consists of a composition (C3) comprising, preferably consisting of:
from 50% to 100% by weight, preferably from 75% to 100% by weight, with respect to the total weight of said composition (C3), of at least one functional fluoropolymer [functional polymer (F1)] comprising recurring units derived from at least one (meth)acrylic monomer [monomer (MA)] of formula (I):

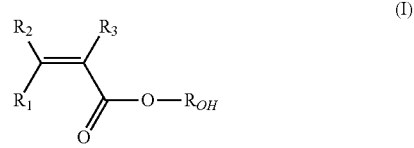

wherein each of $R_1$, $R_2$ and $R_3$, equal to or different from each other, is independently a hydrogen atom or a $C_1$-$C_3$ hydrocarbon group, and $R_{OH}$ is a $C_1$-$C_5$ hydrocarbon group comprising at least one hydroxyl group,
optionally, from 0.1% to 50% by weight, preferably from 0.1% to 25% by weight, with respect to the total weight of said composition (C3), of at least one polymer (F) different from said functional polymer (F1), and
optionally, from 0.1% to 50% by weight, preferably from 0.1% to 25% by weight, with respect to the total weight of said composition (C3), of at least one epoxy resin [resin (E2)], said resin (E2) being equal to or different from said resin (E1).

The polymer (F) of the composition (C3), if any, is typically selected from the group consisting of functional fluoropolymers [functional polymers (F)] and non-functional fluoropolymers [non-functional polymers (F)].

The multilayer assembly of the invention advantageously further comprises a layer [layer (L4)] consisting of a composition [composition (C4)] comprising at least one non-functional polymer (F), said layer (L4) having a first surface and a second surface, wherein the first surface of said layer (L4) is directly adhered to the second surface of the layer (L3).

The composition (C4) may further comprise one or more fillers.

The composition (C4) preferably consists of at least one non-functional polymer (F) and, optionally, one or more fillers.

Non-limiting examples of fillers suitable for use in the composition (C4) include fillers selected from the group consisting of electrically conductive agents and pigments.

The multilayer assembly of the invention may also further comprise a layer [layer (L5)] consisting of a composition [composition (C5)] comprising, preferably consisting of, a foam consisting of at least one polymer (F), said layer (L5) having a first surface and a second surface, wherein the first surface of said layer (L5) is directly applied to the second surface of the layer (L4).

The polymer (F) of the foam of the composition (C5) is typically selected from the group consisting of functional fluoropolymers [functional polymers (F)] and non-functional fluoropolymers [non-functional polymers (F)].

The multilayer assembly of the invention may still further comprise a layer [layer (L6)] consisting of a composition [composition (C6)] comprising, preferably consisting of, at least one polymer selected from the group consisting of polyolefins and polyamides, said layer (L6) having a first surface and a second surface, wherein the first surface of said layer (L6) is directly applied to the second surface of the layer (L5).

Non-limiting examples of suitable polyolefins include, notably, polyethylene and polypropylene.

Each of the layer (L1), layer (L2) and layer (L3) of the multilayer assembly of the invention may be either a monolayer or a multilayer.

Also, each of the layer (L4), layer (L5) and layer (L6) of the multilayer assembly of the invention, if any, may be either a monolayer or a multilayer.

For the purpose of the present invention, the term "monolayer" is used according to its usual meaning to denote a single layer.

For the purpose of the present invention, the term "multilayer" is used according to its usual meaning to denote an assembly consisting of at least two layers.

The multilayer assembly of the invention preferably comprises, more preferably consists of:
a layer (L1) consisting of a composition (C1) consisting of at least one compound (M),
said layer (L1) having a first surface and a second surface,
a layer (L2) consisting of a composition (C2) consisting of:
from 10% to 100% by weight, preferably from 50% to 100% by weight, with respect to the total weight of said composition (C2), of at least one resin (E1), optionally, from 0.1% to 90% by weight, preferably from 0.1% to 50% by weight, with respect to the total weight of said composition (C2), of at least one polymer (F), and
optionally, one or more additives,
said layer (L2) having a first surface and a second surface, wherein the first surface of said layer (L2) is directly adhered to the second surface of said layer (L1),
a layer (L3) consisting of a composition (C3) consisting of:
from 50% to 100% by weight, preferably from 75% to 100% by weight, with respect to the total weight of said composition (C3), of at least one functional fluoropolymer [functional polymer (F1)] comprising recurring units derived from at least one (meth)acrylic monomer [monomer (MA)] of formula (I):

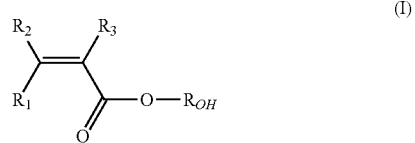

wherein each of $R_1$, $R_2$ and $R_3$, equal to or different from each other, is independently a hydrogen atom or a $C_1$-$C_3$ hydrocarbon group, and $R_{OH}$ is a $C_1$-$C_5$ hydrocarbon group comprising at least one hydroxyl group,
optionally, from 0.1% to 50% by weight, preferably from 0.1% to 25% by weight, with respect to the total weight of said composition (C3), of at least one polymer (F) different from said functional polymer (F1), and
optionally, from 0.1% to 50% by weight, preferably from 0.1% to 25% by weight, with respect to the total weight of said composition (C3), of at least one resin (E2), said resin (E2) being equal to or different from said resin (E1),
said layer (L3) having a first surface and a second surface, wherein the first surface of said layer (L3) is directly adhered to the second surface of said layer (L2),
optionally, a layer (L4) consisting of a composition (C4) consisting of at least one non-functional polymer (F) and, optionally, one or more fillers,
said layer (L4) having a first surface and a second surface, wherein the first surface of said layer (L4) is directly adhered to the second surface of said layer (L3),
optionally, a layer (L5) consisting of a composition (C5) consisting of a composition (C5) comprising, preferably consisting of, a foam consisting of at least one polymer (F),
said layer (L5) having a first surface and a second surface, wherein the first surface of said layer (L5) is directly applied to the second surface of the layer (L4), and
optionally, a layer (L6) consisting of a composition (C6) comprising, preferably consisting of, at least one polymer selected from the group consisting of polyolefins and polyamides,
said layer (L6) having a first surface and a second surface, wherein the first surface of said layer (L6) is directly applied to the second surface of the layer (L5).

The multilayer assembly of the invention is typically in the form of either a multilayer film or of a multilayer shaped article such as a pipe.

In a second instance, the present invention pertains to a process for the manufacture of a multilayer assembly, said process comprising:

(i) providing a layer (L1) as defined above, said layer (L1) having a first surface and a second surface;

(ii) applying a layer (L2) as defined above onto the second surface of said layer (L1), said layer (L2) having a first surface and a second surface, wherein the first surface of said layer (L2) is directly adhered to the second surface of said layer (L1); and (iii) applying a layer (L3) as defined above onto the second surface of said layer (L2), said layer (L3) having a first surface and a second surface, wherein the first surface of said layer (L3) is directly adhered to the second surface of said layer (L2).

The process of the invention advantageously further comprises:

(iv) applying a layer (L4) as defined above onto the second surface of the layer (L3) as defined above, said layer (L4) having a first surface and a second surface, wherein the first surface of said layer (L4) is directly adhered to the second surface of said layer (L3);

(v) optionally, applying a layer (L5) as defined above onto the second surface of the layer (L4) as defined above, said layer (L5) having a first surface and a second surface, wherein the first surface of said layer (L5) is directly applied to the second surface of said layer (L4); and (vi) optionally, applying a layer (L6) as defined above onto the second surface of the layer (L5) as defined above, said layer (L6) having a first surface and a second surface, wherein the first surface of said layer (L6) is directly applied to the second surface of said layer (L5).

The multilayer assembly of the invention is advantageously obtainable by the process of the invention.

In a third instance, the present invention pertains to a multilayer pipe comprising the multilayer assembly of the invention.

The multilayer pipe of the invention typically has an inner layer and an outer layer, wherein at least one of the inner layer and the outer layer of said multilayer pipe is a layer (L1) as defined above.

According to an embodiment of the invention, at least one end portion of the multilayer pipe of the invention may comprise a metal pipe, said metal pipe having an inner layer and an outer layer, wherein at least one of the inner layer and the outer layer of said metal pipe is a layer (L1) as defined above.

According to a first embodiment of the invention, the multilayer pipe comprises the multilayer assembly of the invention, wherein the inner layer of said multilayer pipe is a layer (L1) as defined above.

The multilayer pipe according to this first embodiment of the invention typically further comprises:
- a layer (L4) as defined above, said layer (L4) having a first surface and a second surface, wherein the first surface of said layer (L4) is directly adhered to the second surface of the layer (L3),
- optionally, a layer (L5) as defined above, said layer (L5) having a first surface and a second surface, wherein the first surface of said layer (L5) is directly applied to the second surface of the layer (L4), and
- optionally, a layer (L6) as defined above, said layer (L6) having a first surface and a second surface, wherein the first surface of said layer (L6) is directly applied to the second surface of the layer (L5).

According to a second embodiment of the invention, the multilayer pipe comprises the multilayer assembly of the invention, wherein the outer layer of said multilayer pipe is a layer (L1) as defined above.

The multilayer pipe according to this second embodiment of the invention typically further comprises a layer (L4) as defined above, said layer (L4) having a first surface and a second surface, wherein the first surface of said layer (L4) is directly adhered to the second surface of the layer (L3).

According to a third embodiment of the invention, the multilayer pipe comprises the multilayer assembly of the invention, wherein both the inner layer and the outer layer of said multilayer pipe is a layer (L1) as defined above.

In a fourth instance, the present invention pertains to a process for the manufacture of the multilayer pipe of the invention.

The process for the manufacture of the multilayer pipe of the invention typically comprises steps (i) to (iii) of the process for the manufacture of the multilayer assembly of the invention, wherein, under step (i), a metal pipe is provided, said metal pipe having an inner layer and an outer layer, wherein at least one of the inner layer and the outer layer of said metal pipe is a layer (L1) as defined above.

Should the multilayer assembly of the invention further comprise at least one layer (L4) as defined above, the multilayer pipe of the invention is typically obtainable by a process comprising steps (i) to (iv) of the process for the manufacture of the multilayer assembly of the invention, wherein, under step (i), a metal pipe is provided, said metal pipe having an inner layer and an outer layer, wherein at least one of the inner layer and the outer layer of said metal pipe is a layer (L1) as defined above.

Should the multilayer assembly of the invention further comprise at least one layer (L5) as defined above, the multilayer pipe of the invention is typically obtainable by a process comprising steps (i) to (v) of the process for the manufacture of the multilayer assembly of the invention, wherein, under step (i), a metal pipe is provided, said metal pipe having an inner layer and an outer layer, wherein the outer layer of said metal pipe is a layer (L1) as defined above.

Should the multilayer assembly of the invention further comprise at least one layer (L6) as defined above, the multilayer pipe of the invention is typically obtainable by a process comprising steps (i) to (vi) of the process for the manufacture of the multilayer assembly of the invention, wherein, under step (i), a metal pipe is provided, said metal pipe having an inner layer and an outer layer, wherein the outer layer of said metal pipe is a layer (L1) as defined above.

Under step (i) of the process of the invention, the layer (L1) is typically:

(i-a) cleaned using a suitable solvent, preferably an alcohol or an inorganic solvent, and/or (i-b) treated by any of abrasive blasting techniques including, but not limited to, wet abrasive blasting, hydro-blasting and micro-abrasive blasting using either an organic solvent or a mineral solvent, such as for example $H_3PO_4$.

Under step (i) of the process of the invention, the layer (L1) is advantageously heated to a temperature comprised between 150° C. and 300° C.

The skilled person will determine the proper temperature depending on the processing temperature of the composition (C2).

Under step (ii) of the process of the invention, the composition (C2) may be either a solid composition or a liquid composition. Under step (ii) of the process of the invention, the composition (C2) is preferably a solid composition, more preferably in the form of powder.

Under step (ii) of the process of the invention, the layer (L2) is typically applied by any suitable techniques, preferably by electrostatic powder coating.

Electrostatic powder coating is usually performed by means of an electrostatic spray gun, which uses the principle of electrophoresis that electrically polarized particles are attracted to a grounded or oppositely charged surface.

When electrostatic powder coating is used, the skilled person will select the proper output settings depending on the nature of the composition to be applied. Good results have been obtained by working between 10 and 60 kV and between 5 µA and 40 µA.

Under step (iii) of the process of the invention, the composition (C3) may be either a solid composition or a liquid composition. Under step (iii) of the process of the invention, the composition (C3) is preferably a solid composition, more preferably in the form of powder.

Under step (iii) of the process of the invention, the layer (L3) is typically applied by any suitable techniques, preferably by electrostatic powder coating.

Under step (iv) of the process of the invention, if any, the composition (C4) may be either a solid composition or a liquid composition. Under step (iv) of the process of the invention, if any, the composition (C4) is preferably a solid composition, more preferably in the form of powder or pellets.

Under step (iv) of the process of the invention, if any, the layer (L4) is typically applied by any suitable techniques, preferably by electrostatic powder coating or by roll extrusion.

Roll extrusion is usually performed by known techniques.

Under any of step (ii), step (iii) and step (iv) of the process of the invention, when electrostatic powder coating is used, the multilayer assembly thereby provided is typically baked, preferably at a temperature comprised between 180° C. and 260° C.

Under step (v) of the process of the invention, if any, the layer (L5) is typically applied by any suitable techniques, preferably by tape wrapping, co-extrusion, extrusion coating or by injection moulding.

The layer (L6), if any, is typically applied by any suitable techniques, preferably by extrusion.

Optionally, in order to achieve a desired thickness of the layer (L2), step (ii) may be repeated, for example two or more than two times, before step (iii).

Optionally, in order to achieve a desired thickness of the layer (L3), step (iii) may be repeated, for example two or more than two times, before step (iv), if any.

Optionally, in order to achieve a desired thickness of the layer (L4), if any, step (iv) may be repeated, for example two or more than two times, before step (v), if any.

Optionally, in order to achieve a desired thickness of the layer (L5), if any, step (v) may be repeated, for example two or more than two times, before any subsequent step, if any.

The layer (L2) typically has a thickness comprised between 150 µm and 700 µm, preferably between 250 µm and 500 µm.

The layer (L3) typically has a thickness comprised between 150 µm and 700 µm, preferably between 200 µm and 500 µm.

The layer (L4), if any, typically has a thickness comprised between 500 µm and 3000 µm, preferably between 1000 µm and 1500 µm.

The layer (L5) typically has any suitable thickness. The skilled in the art will determine the proper thickness of the layer (L5) as a function of the final use of the multilayer assembly of the invention.

The thickness is typically measured according to any suitable procedures.

In a fifth instance, the present invention pertains to a field joint multilayer pipe comprising at least two multilayer pipes of the invention.

For the purpose of the present invention, the term "field joint" is intended to denote the location where the multilayer pipes are joined to each other.

The field joint multilayer pipe of the invention comprises at least two multilayer pipes of the invention, said multilayer pipes being advantageously joined to each other.

The multilayer pipes of the field joint multilayer pipe of the invention are typically according to the second embodiment of the invention, wherein the outer layer of said multilayer pipes is a layer (L1) as defined above.

The field joint multilayer pipe of the invention preferably comprises at least two multilayer pipes, wherein the metal pipes of said at least two multilayer pipes have the same inner diameter, said multilayer pipes being advantageously joined to each other.

The field joint multilayer pipe of the invention typically has a continuous joint area extending along the metal pipes of the at least two multilayer pipes.

The field joint multilayer pipe of the invention more preferably comprises:
 at least two multilayer pipes, wherein at least one end portion of each multilayer pipe comprises a metal pipe, said metal pipe having an inner layer and an outer layer, wherein the outer layer of said metal pipe is a layer (L1), said layer (L1) having a first surface and a second surface, said metal pipes being joined to each other thereby providing a joint metal pipe, said joint metal pipe having an inner layer and an outer layer, wherein the outer layer of said joint metal pipe is a layer (L1), said layer (L1) having a first surface and a second surface, and
 at least one field joint multilayer assembly comprising:
 said joint metal pipe,
 a layer (L2), said layer (L2) having a first surface and a second surface, wherein the first surface of said layer (L2) is directly adhered to the second surface of said layer (L1),
 a layer (L3), said layer (L3) having a first surface and a second surface, wherein the first surface of said layer (L3) is directly adhered to the second surface of said layer (L2),
 optionally, a layer (L4), said layer (L4) having a first surface and a second surface, wherein the first surface of said layer (L4) is directly adhered to the second surface of said layer (L3),
 optionally, a layer (L5), said layer (L5) having a first surface and a second surface, wherein the first surface of said layer (L5) is directly applied to the second surface of said layer (L4), and
 optionally, a layer (L6), said layer (L6) having a first surface and a second surface, wherein the first surface of said layer (L6) is directly applied to the second surface of said layer (L5).

In a sixth instance, the present invention pertains to a process for the manufacture of the field joint multilayer pipe of the invention.

The process for the manufacture of the field joint multilayer pipe of the invention is advantageously carried out without using an oven.

The process for the manufacture of the field joint multilayer pipe of the invention typically comprises:

(i'-a) providing at least two multilayer pipes, wherein at least one end portion of each multilayer pipe comprises a metal pipe, said metal pipe having an inner layer and an outer layer, wherein the outer layer of said metal pipe is a layer (L1), said layer (L1) having a first surface and a second surface;

(i'-b) joining to each other the metal pipes of the at least two multilayer assemblies provided in step (i'-a) thereby providing a joint metal pipe, said joint metal pipe having an inner layer and an outer layer, wherein the outer layer of said joint metal pipe is a layer (L1), said layer (L1) having a first surface and a second surface;

(ii') applying a layer (L2) onto the second surface of said layer (L1), said layer (L2) having a first surface and a second surface, wherein the first surface of said layer (L2) is directly adhered to the second surface of said layer (L1);

(iii') applying a layer (L3) onto the second surface of said layer (L2), said layer (L3) having a first surface and a second surface, wherein the first surface of said layer (L3) is directly adhered to the second surface of said layer (L2);

(iv') optionally, applying a layer (L4) onto the second surface of the layer (L3), said layer (L4) having a first surface and a second surface, wherein the first surface of said layer (L4) is directly adhered to the second surface of said layer (L3);

(v') optionally, applying a layer (L5) onto the second surface of the layer (L4), said layer (L5) having a first surface and a second surface, wherein the first surface of said layer (L5) is directly applied to the second surface of said layer (L4); and (vi') optionally, applying a layer (L6) onto the second surface of the layer (L5), said layer (L6) having a first surface and a second surface, wherein the first surface of said layer (L6) is directly applied to the second surface of said layer (L5).

Under step (i'-b) of the process of the invention, the metal pipes of the at least two multilayer pipes are joined to each other typically by welding.

Under step (ii') of the process of the invention, the layer (L2) is typically applied by any suitable techniques, preferably by spray coating such as by electrostatic powder coating.

Under step (iii') of the process of the invention, the layer (L3) is typically applied by any suitable techniques, preferably by electrostatic powder coating or by thermal spraying.

Should the layer (L3) be applied by electrostatic powder coating, the layer (L3) so obtained is typically put under a heat source.

Non-limiting examples of heat sources include, for instance, infrared lamps and electric heaters such as electric air heaters.

Under step (iv') of the process of the invention, if any, the layer (L4) is typically applied by any suitable techniques, preferably by electrostatic powder coating, by thermal spraying, by extrusion coating or by injection moulding.

Under step (v') of the process of the invention, if any, the layer (L5) is typically applied by any suitable techniques, preferably by tape wrapping, co-extrusion, extrusion coating or by injection moulding.

Under step (vi') of the process of the invention, if any, the layer (L6) is typically applied by any suitable techniques, preferably by extrusion.

Optionally, in order to achieve a desired thickness of the layer (L2), step (ii') may be repeated, for example two or more than two times, before step (iii').

Optionally, in order to achieve a desired thickness of the layer (L3), step (iii') may be repeated, for example two or more than two times, before step (iv'), if any.

Optionally, in order to achieve a desired thickness of the layer (L4), if any, step (iv') may be repeated, for example two or more than two times, before step (v'), if any.

Optionally, in order to achieve a desired thickness of the layer (L5), if any, step (v') may be repeated, for example two or more than two times, before any subsequent step, if any.

The layer (L2) typically has a thickness comprised between 150 μm and 700 μm, preferably between 250 μm and 500 μm.

The layer (L3) typically has a thickness comprised between 150 μm and 700 μm, preferably between 200 μm and 500 μm.

The layer (L4), if any, typically has a thickness comprised between 500 μm and 3000 μm, preferably between 1000 μm and 1500 μm.

The layer (L5) typically has any suitable thickness. The skilled in the art will determine the proper thickness of the layer (L5) as a function of the final use of the multilayer assembly of the invention.

In a seventh instance, the present invention pertains to use of either the multilayer pipe of the invention or the field joint multilayer pipe of the invention in upstream, midstream or downstream applications for conveying hydrocarbons and/or gases.

The composition (C1) comprises, preferably consists of, at least one compound (M).

The compound (M) is typically steel such as stainless steel or carbon steel.

The resin (E1) is typically obtainable by condensation of an epoxy compound such as epichlorohydrin or glycerol dichlorohydrin with a polyhydric alcohol such as an aliphatic alcohol or an aliphatic polyol, preferably glycerol or pentaerythritol, or an aromatic alcohol or an aromatic polyol such as a dihydric phenol, preferably bisphenol A or bisphenol F, or a trihydric phenol.

According to an embodiment of the invention, the polyhydric alcohol may comprise one or more halogen atoms, preferably one or more bromine atoms.

The resin (E1) is preferably selected from the group consisting of bisphenol A epoxy resins, novolac epoxy resins and aliphatic epoxy resins.

The bisphenol A epoxy resins are typically manufactured by condensation of bisphenol A or the diglycidyl ether of bisphenol A and epichlorohydrin.

The novolac epoxy resins are typically selected from the group consisting of epoxy phenol novolacs and epoxy cresol novolacs.

The epoxy phenol novolacs are typically manufactured by reaction of phenol with formaldehyde and subsequent condensation with epichlorohydrin.

The epoxy cresol novolacs are typically manufactured by reaction of cresol with formaldehyde and subsequent condensation with epichlorohydrin.

The aliphatic epoxy resins are typically selected from the group consisting of glycidyl epoxy resins and cycloaliphatic epoxy resin.

The glycidyl epoxy resins are typically manufactured by condensation of an aliphatic alcohol or an aliphatic polyol and epichlorohydrin.

The cycloaliphatic epoxy resins typically have epoxide groups attached directly to one or more cycloaliphatic rings.

The bisphenol A epoxy resin is preferably or formula:

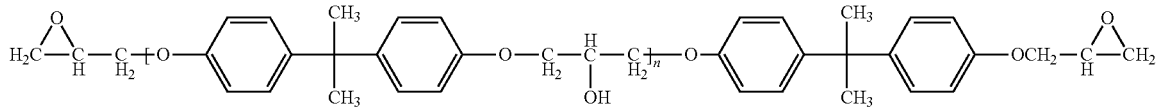

wherein n is from about 2 to about 30.

The cresol novolac epoxy resin is preferably of formula:

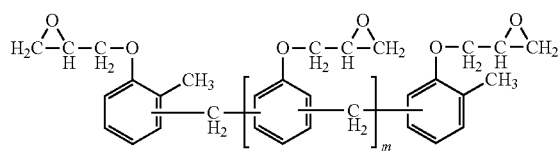

wherein m is from about 5 to about 25.

The composition (C2) may also further comprise one or more additives.

The composition (C2) preferably consists of:
from 10% to 100% by weight, preferably from 50% to 100% by weight, with respect to the total weight of said composition (C2), of at least one resin (E1),
optionally, from 0.1% to 90% by weight, preferably from 0.1% to 50% by weight, with respect to the total weight of said composition (C2), of at least one polymer (F), and
optionally, one or more additives.

Non-limiting examples of additives suitable for use in the composition (C2) include additives selected from the group consisting of curing agents such as amine curing agents, metal oxides, fillers, pigments and colorants.

Examples of amine curing agents which may be employed include, but are not limited to, polyamidoamines (such as polyamidoamines derived from dimerized linoleic acid and diethylenetriamine), amidoamines (such as amidoamines derived from stearic acid), aliphatic amine adducts, alkylene oxide/polyamine adducts, polyalkylene oxide amines, products of the amination of polypropylene glycol or polyethylene glycol, ketimines, dicyandiamide and aromatic amines.

Examples of metal oxides which may be employed include, but are not limited to, cobaltic oxide, cobaltous oxide, cobalto-cobaltic oxide, titanium dioxide and zinc dioxide.

Examples of fillers which may be employed include, but are not limited to, sulphates such as barium sulphate and calcium sulphate and silicates such as calcium metasilicate.

The resin (E2) is defined as the resin (E1) as defined above, said resin (E2) being equal to or different from said resin (E1).

For the purpose of the present invention, the term "fluoropolymer [polymer (F)]" is intended to denote a polymer comprising recurring units derived from at least one fluorinated monomer [monomer (F)].

By the term "fluorinated monomer [monomer (F)]" it is hereby intended to denote an ethylenically unsaturated monomer comprising at least one fluorine atom.

The polymer (F) may be amorphous or semi-crystalline.

The term "amorphous" is hereby intended to denote a fluoropolymer having a heat of fusion of less than 5 J/g, preferably of less than 3 J/g, more preferably of less than 2 J/g, as measured according to ASTM D-3418-08.

The term "semi-crystalline" is hereby intended to denote a fluoropolymer having a heat of fusion of from 10 to 90 J/g, preferably of from 30 to 60 J/g, more preferably of from 35 to 55 J/g, as measured according to ASTM D3418-08.

The polymer (F) is preferably semi-crystalline.

The polymer (F) may be either a functional fluoropolymer [functional polymer (F)] or a non-functional fluoropolymer [non-functional polymer (F)].

For the purpose of the present invention, the term "functional fluoropolymer [functional polymer (F)]" is intended to denote a fluoropolymer further comprising recurring units derived from at least one functional monomer.

For the purpose of the present invention, the term "non-functional fluoropolymer [non-functional polymer (F)]" is intended to denote a fluoropolymer free from recurring units derived from at least one functional monomer.

By the term "functional monomer" it is hereby intended to denote a monomer comprising at least one functional group.

The functional monomer may be either a functional fluorinated monomer [functional monomer (F)] or a functional hydrogenated monomer [functional monomer (H)].

By the term "hydrogenated monomer [monomer (H)]" it is hereby intended to denote an ethylenically unsaturated monomer comprising at least one hydrogen atom and free from fluorine atoms.

The monomer (F) may further comprise one or more other halogen atoms (Cl, Br, I). Should the monomer (F) be free from one or more hydrogen atoms, it is designated as per(halo)fluoromonomer. Should the monomer (F) comprise at least one hydrogen atom, it is designated as hydrogen-containing fluorinated monomer.

Non-limiting examples of suitable monomers (F) include, notably, the followings:
$C_2$-$C_8$ perfluoroolefins, such as tetrafluoroethylene and hexafluoropropylene;
$C_2$-$C_8$ hydrogenated fluoroolefins, such as vinylidene fluoride, vinyl fluoride, 1,2-difluoroethylene and trifluoroethylene;
perfluoroalkylethylenes complying with formula $CH_2=CH-R_{f0}$ wherein $R_{f0}$ is a $C_1$-$C_6$ perfluoroalkyl;
chloro- and/or bromo- and/or iodo-$C_2$-$C_6$ fluoroolefins, such as chlorotrifluoroethylene;
(per)fluoroalkylvinylethers complying with formula $CF_2=CFOR_{f1}$ wherein $R_{f1}$ is a $C_1$-$C_6$ fluoro- or perfluoroalkyl, e.g. $CF_3$, $C_2F_5$, $C_3F_7$;
$CF_2=CFOX_0$ (per)fluoro-oxyalkylvinylethers wherein $X_0$ is a $C_1$-$C_{12}$ alkyl group, a $C_1$-$C_{12}$ oxyalkyl group or a $C_1$-$C_{12}$ (per)fluorooxyalkyl group having one or more ether groups, such as perfluoro-2-propoxy-propyl group;

(per)fluoroalkylvinylethers complying with formula $CF_2=CFOCF_2ORf_2$ wherein $R_{f2}$ is a $C_1$-$C_6$ fluoro- or perfluoroalkyl group, e.g. $CF_3$, $C_2F_5$, $C_3F_7$ or a $C_1$-$C_6$ (per)fluorooxyalkyl group having one or more ether groups, such as —$C_2F_5$—O—$CF_3$;

functional (per)fluoro-oxyalkylvinylethers complying with formula $CF_2=CFOY_0$ wherein $Y_0$ is a $C_1$-$C_{12}$ alkyl group or (per)fluoroalkyl group, a $C_1$-$C_{12}$ oxyalkyl group or a $C_1$-$C_{12}$ (per)fluorooxyalkyl group having one or more ether groups and $Y_0$ comprising a carboxylic or sulfonic acid group, in its acid, acid halide or salt form; and fluorodioxoles, preferably perfluorodioxoles.

Should the monomer (F) be a hydrogen-containing fluorinated monomer, such as for instance vinylidene fluoride, trifluoroethylene, vinyl fluoride, the polymer (F) is either a polymer comprising recurring units derived from said hydrogen-containing fluorinated monomer or it is a polymer comprising recurring units derived from said hydrogen-containing fluorinated monomer and at least one other monomer.

Should the monomer (F) be a per(halo)fluoromonomer, such as for instance tetrafluoroethylene, chlorotrifluoroethylene, hexafluoropropylene, perfluoroalkylvinylethers, the polymer (F) is a polymer comprising recurring units derived from said per(halo)fluoromonomer and at least one monomer (H).

The polymer (F) preferably comprises more than 25% by moles, preferably more than 30% by moles of recurring units derived from at least one monomer (F).

The polymer (F) may further comprise recurring units derived from at least one monomer (H).

Non-limiting examples of suitable monomers (H) include, notably, ethylene, propylene and isobutylene, and styrene monomers such as styrene and p-methylstyrene.

Should the polymer (F) further comprise recurring units derived from at least one monomer (H), it preferably comprises more than 1% by moles, preferably more than 5% by moles, more preferably more than 10% by moles of recurring units derived from said at least one monomer (H).

The polymer (F) is typically obtainable by suspension polymerization or emulsion polymerization according to procedures already known in the art.

Should the monomer (F) be a hydrogen-containing fluorinated monomer, such as for instance vinylidene fluoride, trifluoroethylene, vinyl fluoride, the functional polymer (F) is either a polymer comprising recurring units derived from said hydrogen-containing fluorinated monomer and at least one functional monomer, or it is a polymer comprising recurring units derived from said hydrogen-containing fluorinated monomer, at least one functional monomer and at least one other monomer.

Should the monomer (F) be a per(halo)fluoromonomer, such as for instance tetrafluoroethylene, chlorotrifluoroethylene, hexafluoropropylene, perfluoroalkylvinylethers, the functional polymer (F) is a polymer comprising recurring units derived from said per(halo)fluoromonomer, at least one functional monomer and at least one monomer (H) different from said functional monomer.

The functional polymer (F) preferably comprises more than 25% by moles, preferably more than 30% by moles of recurring units derived from at least one monomer (F).

The functional polymer (F) preferably comprises recurring units derived from vinylidene fluoride (VDF), at least one functional monomer and, optionally, at least one monomer (F) different from VDF.

The functional polymer (F) more preferably comprises:

(a) at least 60% by moles, preferably at least 75% by moles, more preferably at least 85% by moles of vinylidene fluoride (VDF), (b) optionally, from 0.1% to 15% by moles, preferably from 0.1% to 12% by moles, more preferably from 0.1% to 10% by moles of at least one monomer (F) selected from the group consisting of vinyl fluoride ($VF_1$), chlorotrifluoroethylene (CTFE), hexafluoropropylene (HFP), tetrafluoroethylene (TFE), trifluoroethylene (TrFE) and perfluoromethylvinylether (PMVE), and (c) from 0.01% to 20% by moles, preferably from 0.05% to 15% by moles, more preferably from 0.1% to 10% by moles of at least one functional monomer.

The functional monomer is preferably a functional monomer (H) selected from the group consisting of (meth)acrylic monomers [monomers (MA)] of formula (I) as defined above.

The functional polymer (F) is preferably a functional polymer (F1), said functional polymer (F1) comprising recurring units derived from at least one monomer (F) and at least one monomer (MA) of formula (I) as defined above.

The functional polymer (F1) preferably comprises recurring units derived from vinylidene fluoride (VDF), at least one monomer (MA) of formula (I) as defined above and, optionally, at least one monomer (F) different from VDF.

The functional polymer (F1) comprises preferably at least 0.01% by moles, more preferably at least 0.05% by moles, even more preferably at least 0.1% by moles of recurring units derived from at least one monomer (MA) of formula (I) as defined above.

The functional polymer (F1) comprises preferably at most 20% by moles, more preferably at most 15% by moles, even more preferably at most 10% by moles, most preferably at most 3% by moles of recurring units derived from at least one monomer (MA) of formula (I) as defined above.

Determination of average mole percentage of monomer (MA) recurring units in the functional polymer (F1) can be performed by any suitable method. Mention can be notably made of acid-base titration methods, well suited e.g. for the determination of the acrylic acid content, of NMR methods, adequate for the quantification of monomers (MA) comprising aliphatic hydrogen atoms in side chains, of weight balance based on total fed monomer (MA) and unreacted residual monomer (MA) during manufacture of said functional polymer (F1).

The monomer (MA) is preferably of formula (II):

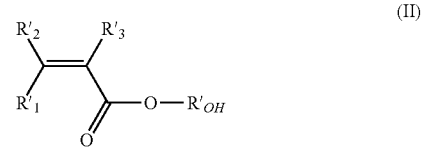

wherein $R'_1$, $R'_2$ and $R'_3$ are hydrogen atoms and $R'_{OH}$ is a $C_1$-$C_5$ hydrocarbon group comprising at least one hydroxyl group, preferably a $C_2$-$C_3$ hydrocarbon group comprising at least one hydroxyl group.

The monomer (MA) is more preferably selected from the group consisting of hydroxyethyl(meth)acrylate, hydroxypropyl(meth)acrylate, hydroxyethylhexyl(meth)acrylate.

The monomer (MA) is even more preferably selected from the group consisting of:

hydroxyethyl acrylate (HEA) of formula:

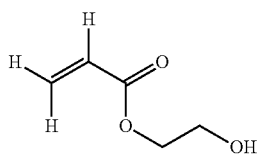

2-hydroxypropyl acrylate (HPA) of either of formulae:

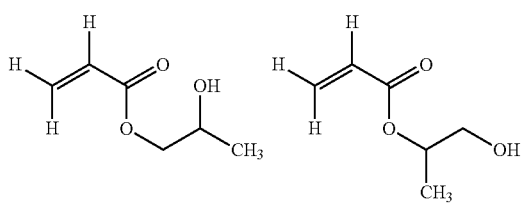

and mixtures thereof.

The functional polymer (F1) is preferably a random polymer comprising linear sequences of randomly distributed recurring units derived from at least one monomer (F) and at least one monomer (MA).

The functional polymer (F1) is more preferably a random polymer comprising at least 20%, preferably at least 40%, more preferably at least 60% of linear sequences of randomly distributed recurring units derived from at least one monomer (F) and at least one monomer (MA).

The expression "randomly distributed recurring units" is intended to denote the percent ratio between the average number of monomer (MA) sequences (%), said sequences being comprised between two recurring units derived from at least one monomer (F) and the total average number of recurring units derived from at least one monomer (MA) (%).

When each of the recurring units derived from at least one monomer (MA) is isolated, that is to say that a recurring unit derived from a monomer (MA) is comprised between two recurring units of at least one monomer (F), the average number of monomer (MA) sequences equals the average total number of recurring units derived from at least one monomer (MA), so that the fraction of randomly distributed recurring units derived from at least one monomer (MA) is 100%: this value corresponds to a perfectly random distribution of recurring units derived from at least one monomer (MA). Thus, the larger is the number of isolated recurring units derived from at least one monomer (MA) with respect to the total number of recurring units derived from at least one monomer (MA), the higher will be the percentage value of fraction of randomly distributed recurring units derived from at least one monomer (MA).

Determination of average mole percentage of randomly distributed monomer (MA) recurring units in the functional polymer (F1) can be performed by any suitable method. Mention can be notably made of NMR methods.

The functional polymer (F1) is typically obtainable by suspension polymerization according to any procedures already known in the art such as, for instance, according to the process disclosed in WO 2008/129041 (SOLVAY SPECIALTY POLYMERS ITALY S.P.A.) Oct. 30, 2008.

The polymer (F1) may be advantageously manufactured by a process comprising polymerizing at least one monomer (F) and at least one monomer (MA) in a reaction vessel comprising an aqueous medium, in the presence of a radical initiator, said process comprising:
continuously feeding an aqueous solution comprising said at least one monomer (MA), and
maintaining the pressure in said reactor vessel exceeding the critical pressure of said at least one monomer (F).

The pressure is typically maintained at a value of more than 50 bar, preferably of more than 75 bar, even more preferably of more than 100 bar.

The process is typically carried out at a temperature of at least 35° C., preferably of at least 40° C., more preferably of at least 45° C.

Should the monomer (F) be a hydrogen-containing fluorinated monomer, such as for instance vinylidene fluoride, trifluoroethylene, vinyl fluoride, the non-functional polymer (F) is either a polymer comprising recurring units derived from said hydrogen-containing fluorinated monomer or it is a polymer comprising recurring units derived from said hydrogen-containing fluorinated monomer and at least one other monomer.

Should the monomer (F) be a per(halo)fluoromonomer, such as for instance tetrafluoroethylene, chlorotrifluoroethylene, hexafluoropropylene, perfluoroalkylvinylethers, the non-functional polymer (F) is a polymer comprising recurring units derived from said per(halo)fluoromonomer and at least one monomer (H).

The non-functional polymer (F) preferably comprises more than 25% by moles, preferably more than 30% by moles of recurring units derived from at least one monomer (F).

The non-functional polymer (F) preferably comprises recurring units derived from vinylidene fluoride (VDF) and, optionally, at least one monomer (F) different from VDF.

The non-functional polymer (F) more preferably comprises:
(a') at least 60% by moles, preferably at least 75% by moles, more preferably at least 85% by moles of vinylidene fluoride (VDF), and
(b') optionally, from 0.1% to 15% by moles, preferably from 0.1% to 12% by moles, more preferably from 0.1% to 10% by moles of at least one monomer (F) selected from the group consisting of vinyl fluoride ($VF_1$), chlorotrifluoroethylene (CTFE), hexafluoropropylene (HFP), tetrafluoroethylene (TFE), trifluoroethylene (TrFE) and perfluoromethylvinylether (PMVE).

For the purpose of the present invention, the term "foam" is intended to denote a solid polymer matrix having incorporated therein gas pockets.

The foam typically has a thermal conductivity comprised between 0.01 and 0.25 W/(m·K), preferably between 0.01 and 0.1 W/(m·K).

The thermal conductivity of the foam is typically measured by any suitable techniques such as, for instance, according to ASTM E1530 standard method.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Raw Materials

Functional polymer (F1-A): fluoropolymer comprising recurring units derived from VDF and HEA (HEA: 0.9% by moles).

Functional polymer (F1-B): fluoropolymer comprising recurring units derived from VDF and HEA (HEA: 0.8% by moles).

Functional polymer (F2): fluoropolymer comprising recurring units derived from VDF and acrylic acid (AA) (AA: 1.0% by moles).

Non-functional polymer (F3): SOLEF® 6008 VDF-based homopolymer.

Resin (E1-A): bisphenol A-epichlorohydrin epoxy resin.

Manufacture of Functional Polymer (F1)

In a 4 L reactor were introduced 2370 g of demineralized water and 0.85 g of METHOCEL® K100 suspending agent. The mixture was stirred with an impeller running at a speed of 880 rpm. The reactor was purged with sequences of vacuum (30 mmHg) and nitrogen at 20° C. This sequence was done 3 times. Then, diethylcarbonate (DEC), hydroxyethyl acrylate (HEA) and a solution of t-amyl perpivalate initiator in isododecane (75%) were added thereto in amounts as set forth in Table 1. Finally, 1054 g of vinylidene fluoride (VDF) were introduced in the reactor. The reactor was gradually heated until a set-point temperature (see Table 1) and the pressure was fixed at 110 bars. The pressure was kept constantly equal to 110 bars by feeding 710 g of an aqueous solution containing a certain amount of HEA (Table 1) during the polymerization. After this feeding, no more aqueous solution was introduced and the pressure started to decrease. The polymerization was stopped by degassing the reactor until reaching atmospheric pressure. In general, a conversion around 65-75% of monomers was achieved in all working embodiments.

The polymer was collected by filtration and washed in demineralized water. After the washing step, the polymer powder was dried at 65° C. overnight.

TABLE 1

| Functional polymer | T [° C.] | Initiator [g/kg M T *] | DEC [g/kgMnT *] | HEA [g] | |
|---|---|---|---|---|---|
| | | | | initial | feeding |
| (F1-A) | 52 | 6.0 | 5.0 | 0.5 | 14.5 |
| (F1-B) | 57 | 6.0 | 11 | 7.5 | 7.5 |

* kgMnT: kg of total amount of monomers (VDF and HEA)

Manufacture of Functional Polymer (F2)

The same procedure used for the manufacture of the functional polymer (F1) was carried out but using acrylic acid (AA) in place of HEA under the conditions set forth in Table 2 in place of Table 1.

In a 4 L reactor were introduced 2144 g of demineralized water and 0.94 g of METHOCEL® K100 suspending agent.

The pressure was kept constantly equal to 110 bars by feeding 846 g of an aqueous solution containing a certain amount of AA (Table 2) during the polymerization. A conversion of 75% of monomers was achieved.

TABLE 2

| Functional polymer | T [° C.] | Initiator [g/kg M T] | DEC [g/kgMnT] | AA [g] | |
|---|---|---|---|---|---|
| | | | | initial | feeding |
| (F2) | 55 | 7.9 | 30.9 | 0.5 | 11.8 |

* kgMnT: kg of total amount of monomers (VDF and HEA)

EXAMPLE 1

Manufacture of a Multilayer Assembly

A multilayer assembly was prepared including a carbon steel panel or a stainsteel panel as metal layer [layer (L1-A)]. The layer (L1-A) (measuring 10 mm of side and 3 mm of thickness) was prepared by first cleaning the surface of the metal with ethyl alcohol to remove contaminants and then grit blasting the surface with aluminium oxide (10 mesh) thereby providing a roughened surface so as to achieve a stronger adherence of the primer coating layer to the metal layer. Then, the layer (L1-A) so obtained was pre-heated at 75° C. for 15 minutes, rinsed with a 5% w/w solution of $H_3PO_4$ and then with water and finally heated at 260° C. for 20 minutes.

A primer layer [layer (L2-A)] was then applied onto the layer (L1-A) by spraying a composition containing 100% by weight of a resin (E1-A) using an electrostatic spray gun with output setting of 30 kV and 5 µA.

A composition containing 100% by weight of the functional polymer (F1-A) was sprayed immediately onto the layer (L2-A) (less than 20 seconds) by electrostatic powder coating using a second gun that works in the same way of the first gun and under the same conditions thereby providing a tie layer [layer (L3-A)]. The layer (L3-A) is preferably applied before complete crosslinking of the layer (L2-A).

The assembly so obtained was heated in an oven at 240° C. for 10 minutes. The final thickness of the assembly so obtained was about 550 µm.

A further layer [layer (L4-A)] was then applied by compression moulding using a plate of the non-functional polymer (F3) prepared as follows: the non-functional polymer (F3) (40-100 g of pellets) was put within a frame.

Two aluminium foils were then put upon and below to cover the powder in the frame. The film so obtained was put between two steel plates and then put between two press plates. The press plates were then heated at 230° C. for 5 minutes. A water cooling step was finally performed to room temperature. The final thickness of the layer (L4-A) was comprised between 1000 µm and 1500 µm.

The layer (L4-A) so obtained was contacted with the layer (L3-A) of the assembly in the press cavity at 230° C. and subsequently cooled to room temperature by rapid quenching with cooling water.

EXAMPLE 2

Manufacture of a Multilayer Assembly

The same procedure as detailed under Example 1 was followed but using the functional polymer (F1-B).

COMPARATIVE EXAMPLE 1

Manufacture of a Multilayer Assembly

The same procedure as detailed under Example 1 was followed but using a composition containing 100% by weight of the functional polymer (F2) in place of the functional polymer (F1-A).

COMPARATIVE EXAMPLE 2

Manufacture of a Multilayer Assembly

The same procedure as detailed under Example 1 was followed but using a composition containing 100% by weight of the non-functional polymer (F3) in place of the functional polymer (F1-A).

EXAMPLE 3

Manufacture of a Field Joint Multilayer Assembly

The same procedure as detailed under Example 1 was followed thereby providing the multilayer assembly of Example 1, wherein the layer (L1-A) is partially coated, thereby exposing an outer uncoated layer (L1-A) at one end portion of said multilayer assembly.

The uncoated end portion of the multilayer assembly so obtained was coated thereby providing a field joint multilayer assembly using a procedure enabling simulating a field joint coating without using an oven. The uncoated layer (L1-A) (measuring 5 mm of side and 3 mm of thickness) was treated by first cleaning the surface of the metal with ethyl alcohol to remove contaminants and then grit blasting the surface with aluminium oxide (10 mesh) thereby providing a roughened surface so as to achieve a stronger adherence of the primer coating layer to the metal layer. Then, the uncoated layer (L1-A) so obtained was pre-heated with a resistance heater at 240° C. for 15 minutes. An horizontal mask was used to protect the coated area of the multilayer assembly. A primer layer (L2-A) was then applied onto the uncoated layer (L1-A) by spraying a composition containing 100% by weight of a resin (E1-A) using an electrostatic spray gun with output setting of 30 kV and 5 µA.

A composition containing 100% by weight of the functional polymer (F1-A) was sprayed immediately onto the layer (L2-A) (less than 20 seconds) by electrostatic powder coating using a second gun that works in the same way of the first gun and under the same conditions thereby providing a tie layer [layer (L3-A)]. The layer (L3-A) is preferably applied before complete crosslinking of the layer (L2-A). The mask was then removed from the multilayer assembly and was replaced with two blocks of PTFE that allow to limit heat transmission. The assembly so obtained was put under an IR Carbon lamp in order to reach 200° C. for 7 minutes. The final thickness of the assembly was 550 µm. A further layer [layer (L4-A)] was then applied by compression moulding using a plate of the non-functional polymer (F3) prepared as follows: the non-functional polymer (F3) (20-60 g of pellets) was put within a frame. Two aluminium foils were then put upon and below to cover the powder in the frame. The film so obtained was put between two steel plates and then put between two press plates. The press plates were then heated at 230° C. for 5 minutes. A water cooling step was finally performed to room temperature. The final thickness of the layer (L4-A) was comprised between 1000 µm and 1500 µm.

The layer (L4-A) so obtained was contacted with the layer (L3-A) of the assembly in the press cavity at 230° C. and subsequently cooled to room temperature by rapid quenching with cooling water.

Cathodic Disbonding Test

The cathodic disbondment test was performed in accordance with the CSA-Z 245.20 Canadian Standard. The multilayer assembly obtained according to the procedure disclosed in any of Example 1, Example 2, Example 3, Comparative Example 1 and Comparative Example 2 was perforated before starting the test, by drilling a 3 mm diameter hole in the centre of each sample until the metal surface of the layer (L1-A) was exposed. In particular, the field joint multilayer assembly of Example 3 was perforated by drilling a 3 mm diameter hole between the multilayer assembly and said field joint multilayer assembly.

An electrical stress was produced by connecting each of the samples to the negative terminal of a source of direct current and by connecting an anode to the positive terminal.

The conditions applied were: 1.5±0.15 V and 65° C.±3° C.

The samples were then cooled to room temperature.

The cathodic disbondment was evaluated 60 minutes after removal of the heat, by cutting with a knife 8 edges of at least 20 mm from the centre of the hole, such that each cut reached the metal panel. Then, the tip of a blade was inserted under the coating at the hole and the coating was chipped off, continuing until the coating showed a definitive resistance. The distance of chipping was measured from the edge of the original hole along each cut.

The cathodic disbonding test was used in order to test the coatings ability to prevent corrosion attack. The results obtained for each sample are summarized in the following Table 3:

TABLE 3

| Run | (MA) [% by moles] | Distribution (MA) [%] | Chipping distance after 7 days [mm] |
|---|---|---|---|
| Example 1 | 0.9 | 85 | 3.8 |
| Example 2 | 0.8 | 60 | 4 |
| C. Example 1 | 1.0 | — | totally detached |
| C. Example 2 | — | — | totally detached |
| Example 3 | 0.9 | 85 | 3 |

It has been thus found that multilayer assembly of the invention as notably represented by the multilayer assemblies of any of Example 1, Example 2 and Example 3 according to the invention successfully exhibits outstanding interlayer adhesion properties as compared with the multilayer assemblies of any of Comparative Example 1 and Comparative Example 2.

The invention claimed is:
1. A multilayer assembly comprising:
   a layer (L1) consisting of a composition (C1), wherein composition (C1) comprises at least one metal compound (M), said layer (L1) having a first surface and a second surface,
   a layer (L2) consisting of a composition (C2), wherein composition (C2) comprises at least one epoxy resin (E1), said layer (L2) having a first surface and a second surface, wherein the first surface of layer (L2) is directly adhered to the second surface of layer (L1), and
   a layer (L3) consisting of a composition (C3), wherein composition (C3) comprises at least one functional fluoropolymer [functional polymer (F1)] comprising recurring units derived from at least one (meth)acrylic monomer (MA) of formula (I):

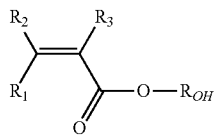

wherein each of $R_1$, $R_2$ and $R_3$, equal to or different from each other, is independently a hydrogen atom or a $C_1$-$C_3$ hydrocarbon group, and $R_{OH}$ is a $C_1$-$O_5$ hydrocarbon group comprising at least one hydroxyl group, said layer (L3) having a first surface and a second surface, wherein the first surface of layer (L3) is directly adhered to the second surface of layer (L2).

2. The multilayer assembly according to claim 1, wherein the functional polymer (F1) is a fluoropolymer comprising recurring units derived from vinylidene fluoride (VDF), at least one monomer (MA) of formula (I) and, optionally, at least one fluorinated monomer (F) different from VDF.

3. The multilayer assembly according to claim 1, wherein composition (C2) further comprises at least one fluoropolymer [polymer (F)].

4. The multilayer assembly according to claim 1, wherein composition (C3) comprises:
  from 50% to 100% by weight, with respect to the total weight of composition (C3), of at least one functional fluoropolymer [functional polymer (F1)] comprising recurring units derived from at least one (meth)acrylic monomer (MA) of formula (I):

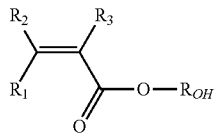

wherein each of $R_1$, $R_2$ and $R_3$, equal to or different from each other, is independently a hydrogen atom or a $C_1$-$C_3$ hydrocarbon group, and $R_{OH}$ is a $C_1$-$O_5$ hydrocarbon group comprising at least one hydroxyl group,
  optionally, from 0.1% to 50% by weight, with respect to the total weight of composition (C3), of at least one polymer (F) different from said functional polymer (F1), and
  optionally, from 0.1% to 50% by weight, with respect to the total weight of composition (C3), of at least one epoxy resin (E2), said resin (E2) being equal to or different from resin (E1).

5. The multilayer assembly according to claim 4, wherein composition (C3) comprises:
  from 75% to 100% by weight, with respect to the total weight of composition (C3), of at least one functional polymer (F1) comprising recurring units derived from at least one (meth)acrylic monomer (MA) of formula (I),
  optionally, from 0.1% to 25% by weight, with respect to the total weight of composition (C3), of at least one polymer (F) different from said functional polymer (F1), and
  optionally, from 0.1% to 25% by weight, with respect to the total weight of composition (C3), of at least one epoxy resin (E2), said resin (E2) being equal to or different from resin (E1).

6. The multilayer assembly according to claim 1, said multilayer assembly further comprising a layer (L4) consisting of a composition (C4), wherein composition (C4) comprises at least one non-functional fluoropolymer [non-functional polymer (F)], said layer (L4) having a first surface and a second surface, wherein the first surface of layer (L4) is directly adhered to the second surface of layer (L3).

7. The multilayer assembly according to claim 6, said multilayer assembly further comprising a layer (L5) consisting of a composition (C5), wherein composition (C5) comprises a foam consisting of at least one polymer (F), said layer (L5) having a first surface and a second surface, wherein the first surface of layer (L5) is directly applied to the second surface of layer (L4).

8. The multilayer assembly according to claim 7, said multilayer assembly further comprising a layer (L6) consisting of a composition (C6), wherein composition (C6) comprises at least one polymer selected from the group consisting of polyolefins and polyamides, said layer (L6) having a first surface and a second surface, wherein the first surface of layer (L6) is directly applied to the second surface of layer (L5).

9. A multilayer pipe comprising the multilayer assembly according to claim 1.

10. The multilayer pipe according to claim 9, said multilayer pipe having an inner layer and an outer layer, wherein the inner layer of said multilayer pipe is a layer (L1).

11. The multilayer pipe according to claim 9, said multilayer pipe having an inner layer and an outer layer, wherein the outer layer of said multilayer pipe is a layer (L1).

12. The multilayer pipe according to claim 9, said multilayer pipe having an inner layer and an outer layer, wherein both the inner layer and the outer layer of said multilayer pipe is a layer (L1).

13. A process for the manufacture of the multilayer assembly according to claim 1 said process comprising:
  (i) providing a layer (L1), said layer (L1) having a first surface and a second surface;
  (ii) applying a layer (L2) onto the second surface of layer (L1), said layer (L2) having a first surface and a second surface, wherein the first surface of layer (L2) is directly adhered to the second surface of layer (L1);
  (iii) applying a layer (L3) onto the second surface of layer (L2), said layer (L3) having a first surface and a second surface, wherein the first surface of layer (L3) is directly adhered to the second surface of layer (L2);
  (iv) optionally, applying a layer (L4) onto the second surface of layer (L3), said layer (L4) having a first surface and a second surface, wherein the first surface of layer (L4) is directly adhered to the second surface of layer (L3);
  (v) optionally, applying a layer (L5) onto the second surface of layer (L4), said layer (L5) having a first surface and a second surface, wherein the first surface of layer (L5) is directly applied to the second surface of layer (L4); and
  (vi) optionally, applying a layer (L6) onto the second surface of layer (L5), said layer (L6) having a first surface and a second surface, wherein the first surface of layer (L6) is directly applied to the second surface of layer (L5).

14. A process for the manufacture of the multilayer pipe according to claim 9, said process comprising:

(i) providing a metal pipe, said metal pipe having an inner layer and an outer layer, wherein at least one of the inner layer and the outer layer of said metal pipe is a layer (L1), said layer (L1) having a first surface and a second surface;

(ii) applying a layer (L2) onto the second surface of layer (L1), said layer (L2) having a first surface and a second surface, wherein the first surface of layer (L2) is directly adhered to the second surface of layer (L1);

(iii) applying a layer (L3) onto the second surface of layer (L2), said layer (L3) having a first surface and a second surface, wherein the first surface of layer (L3) is directly adhered to the second surface of layer (L2);

(iv) optionally, applying a layer (L4) onto the second surface of layer (L3), said layer (L4) having a first surface and a second surface, wherein the first surface of layer (L4) is directly adhered to the second surface of layer (L3);

(v) optionally, applying a layer (L5) onto the second surface of layer (L4), said layer (L5) having a first surface and a second surface, wherein the first surface of layer (L5) is directly applied to the second surface of layer (L4); and (vi) optionally, applying a layer (L6) onto the second surface of layer (L5), said layer (L6) having a first surface and a second surface, wherein the first surface of layer (L6) is directly applied to the second surface of layer (L5).

15. A field joint multilayer pipe comprising at least two multilayer pipes according to claim 9.

16. A process for the manufacture of the field joint multilayer pipe wherein said field joint multilayer pipe comprises at least two multilayer pipes according to claim 9, said process comprising:

(i'-a) providing at least two multilayer pipes according to claim 9, wherein at least one end portion of each multilayer pipe comprises a metal pipe, said metal pipe having an inner layer and an outer layer, wherein the outer layer of said metal pipe is a layer (L1), said layer (L1) having a first surface and a second surface;

(i'-b) joining to each other the metal pipes of said at least two multilayer assemblies provided in step (i'-a) thereby providing a joint metal pipe, said joint metal pipe having an inner layer and an outer layer, wherein the outer layer of said joint metal pipe is a layer (L1), said layer (L1) having a first surface and a second surface;

(ii') applying a layer (L2) onto the second surface of layer (L1), said layer (L2) having a first surface and a second surface, wherein the first surface of layer (L2) is directly adhered to the second surface of layer (L1);

(iii') applying a layer (L3) onto the second surface of layer (L2), said layer (L3) having a first surface and a second surface, wherein the first surface of layer (L3) is directly adhered to the second surface of layer (L2);

(iv') optionally, applying a layer (L4) onto the second surface of the layer (L3), said layer (L4) having a first surface and a second surface, wherein the first surface of layer (L4) is directly adhered to the second surface of layer (L3);

(v') optionally, applying a layer (L5) onto the second surface of the layer (L4), said layer (L5) having a first surface and a second surface, wherein the first surface of layer (L5) is directly applied to the second surface of layer (L4); and (vi') optionally, applying a layer (L6) onto the second surface of layer (L5), said layer (L6) having a first surface and a second surface, wherein the first surface of layer (L6) is directly applied to the second surface of layer (L5).

17. A method for conveying hydrocarbons and/or gases, the method comprising using a Use of either the multilayer pipe according to claim 9 in upstream, midstream or downstream applications.

18. A method for conveying hydrocarbons and/or gases, the method comprising using a field joint multilayer pipe according to claim 15 in upstream, midstream or downstream applications.

* * * * *